(12) United States Patent
Hellmann et al.

(10) Patent No.: US 11,804,612 B2
(45) Date of Patent: Oct. 31, 2023

(54) METHOD FOR OPERATING A FUEL CELL SYSTEM, CONTROL DEVICE, AND FUEL CELL SYSTEM

(71) Applicant: Robert Bosch GmbH, Stuttgart (DE)

(72) Inventors: Mark Hellmann, Korntal (DE); Sergei Hahn, Wendlingen am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/642,833

(22) PCT Filed: Jul. 31, 2020

(86) PCT No.: PCT/EP2020/071674
§ 371 (c)(1),
(2) Date: Mar. 14, 2022

(87) PCT Pub. No.: WO2021/052667
PCT Pub. Date: Mar. 25, 2021

(65) Prior Publication Data
US 2022/0399557 A1    Dec. 15, 2022

(30) Foreign Application Priority Data
Sep. 19, 2019 (DE) ...................... 10 2019 214 285.0

(51) Int. Cl.
*H01M 8/04* (2016.01)
*H01M 8/04746* (2016.01)
(Continued)

(52) U.S. Cl.
CPC ... *H01M 8/04753* (2013.01); *H01M 8/04104* (2013.01); *H01M 8/04111* (2013.01); *H01M 8/04126* (2013.01); *H01M 8/04201* (2013.01)

(58) Field of Classification Search
CPC ......... H01M 8/04753; H01M 8/04104; H01M 8/04111; H01M 8/04126; H01M 8/04201
See application file for complete search history.

(56) References Cited

U.S. PATENT DOCUMENTS

2002/0022161 A1   2/2002   Kurosaki et al.
2012/0328968 A1   12/2012  Honda
(Continued)

FOREIGN PATENT DOCUMENTS

DE   102013017542 A1   4/2015
DE   102015208707 A1   6/2016
(Continued)

OTHER PUBLICATIONS

Translation of International Search Report for Application No. PCT/EP2020/071674 dated Nov. 11, 2020 (3 pages).

*Primary Examiner* — Olatunji A Godo
(74) *Attorney, Agent, or Firm* — Michael Best & Friedrich LLP

(57) ABSTRACT

The invention relates to a method for operating a fuel cell system (100), having a fuel cell stack (20) with a plurality of fuel cells (110) each having at least one cathode portion (K) and at least one anode portion (A), a compressor (10) for conveying air into the cathode portions (K), a pressure-sustaining valve (40), and a control device (50), the at least one cathode portion (K) being arranged downstream of and in fluid communication with the compressor (10) and upstream of and in fluid communication with the pressure-sustaining valve (40), the fuel cell system (100) having a high-pressure region (HDB) between the compressor (10) and the pressure-sustaining valve (40). The invention further relates to a control device (50) and to a fuel cell system (100).

11 Claims, 2 Drawing Sheets

(51) Int. Cl.
*H01M 8/04089* (2016.01)
*H01M 8/04111* (2016.01)
*H01M 8/04119* (2016.01)
*H01M 8/04082* (2016.01)

(56) References Cited

U.S. PATENT DOCUMENTS

2015/0349358 A1* 12/2015 Takeda .............. H01M 8/04753
              429/446
2017/0179504 A1   6/2017 Honda
2020/0287228 A1*  9/2020 Orozco Santos Coy ....................
              B60L 58/34

FOREIGN PATENT DOCUMENTS

DE    102017103517 A1   9/2017
DE    102019101303 A1   7/2019

* cited by examiner

METHOD FOR OPERATING A FUEL CELL SYSTEM, CONTROL DEVICE, AND FUEL CELL SYSTEM

BACKGROUND OF THE INVENTION

In fuel cell systems, particularly for driving motor vehicles, the oxidizing agent oxygen from the ambient air is generally used in order to react in the fuel cell with hydrogen to give water (or water vapor) and thus to supply electric power by electrochemical conversion. The dynamics of the fuel cell system depend primarily on the dynamics of the air system. In this case, the oxygen of the air mass flow required for the reaction is a limiting variable. In the case of step changes in load toward higher fuel cell outputs, in particular fuel cell stack outputs, the rotational speed or the power of the compressor of the air system and thus the air mass flow must be increased.

Furthermore, the water management of the fuel cell system entails an additional requirement on the air system. In the case of step changes to higher fuel cell outputs, more heat is produced, and this must be dissipated from the system. In order to be able to dissipate this heat, it is often necessary to increase the operating temperature. However, the increased temperature in the steady state promotes drying out of the membranes of the fuel cell stack, which has a negative effect on both the performance and the service life of the fuel cell stack. In order to counteract the discharge of water from the system, the operating pressure must therefore be increased. The dynamics of the air mass flow depend on the operating characteristic of the compressor and on the air flow path. The operating characteristic can be influenced by the position of a pressure-maintaining valve of the fuel cell system. The dynamics of the air flow path depend on the dynamics of the compressor. However, the capacity of the compressor is limited. The torque available for accelerating the rotor results from a drive torque of the electric machine minus the friction torque of the rotor of the compressor and the torque from the backpressure of the pressure side of the rotor. As a rule, there is a fixed relationship between the mass flow and a pressure loss as a function of the position of the pressure-maintaining valve. Here, the relationship usually depends on the requirements of the steady-state operating points. A common disadvantage of the known solutions is that there is a conflict of aims between, on the one hand, a very dynamic performance and thus a rapid change in the air mass flow and, on the other hand, a continuous load capacity of the fuel cell system even under demanding operating conditions, such as, for example, high ambient temperatures.

SUMMARY OF THE INVENTION

The present invention discloses a method for operating a fuel cell system, a control device, and a fuel cell system.

Further features and details of the invention will become apparent from the dependent claims, the description and the drawings. Here, features and details which are described in connection with the method according to the invention also apply, of course, in connection with the control device according to the invention and the fuel cell system according to the invention and vice versa in each case, and therefore reciprocal reference is or may always be made in respect of the disclosure relating to the individual aspects of the invention.

According to a first aspect, the present invention shows a method for operating a fuel cell system. The fuel cell system has a fuel cell stack with a multiplicity of fuel cells each having at least one cathode portion and at least one anode portion, a compressor for conveying air into the cathode portions, a pressure-maintaining valve and a control device. The at least one cathode portion is arranged downstream of and in fluid communication with the compressor and upstream of and in fluid communication with the pressure-maintaining valve. The fuel cell system has a high-pressure region between the compressor and the pressure-maintaining valve, wherein the method comprises the following steps:

a) receipt of a demand for an increased air mass flow to the at least one cathode portion by the control device, b) reduction of the pressure in the high-pressure region by at least partial opening of the pressure-maintaining valve by the control device, c) raising of the air mass flow to the at least one cathode portion by means of an increase in the speed of the compressor by the control device, d) increase in the pressure in the high-pressure region by at least partial closure of the pressure-maintaining valve at a constant or approximately constant air mass flow by the control device.

The method according to the invention particularly advantageously allows a response of a fuel cell system to a demand for an increase in load, that is to say a demand for increased energy output by the fuel cell system. The method according to the invention firstly opens the pressure-maintaining valve at least partially, preferably completely, for an increased air mass flow at the inlet of the cathode portion after receipt of a demand for an increased air mass flow. The air mass flow of the fuel cell system is increased by the at least partial opening of the pressure-maintaining valve at a constant or approximately constant rotational speed of the compressor. By opening the pressure-maintaining valve, the pressure resistance of the fuel cell system is reduced for the compressor and thus an increase in the rotational speed of the compressor is facilitated or made possible significantly more quickly. By means of the subsequent, preferably partially simultaneous, increase in rotational speed of the compressor and the opening of the pressure-maintaining valve, a required air mass flow at the inlet of the cathode portion is advantageously set as quickly as possible. For the subsequent or partially parallel pressure increase, a partial closure of the pressure-maintaining valve takes place at a constant or approximately constant air mass flow, in particular at the inlet of the cathode portion. In order to keep the air mass flow constant or approximately constant while the pressure-maintaining valve is being at least partially closed, the rotational speed of the compressor is increased further. In the context of the invention, a high-pressure region is to be understood to mean a region with increased pressure. An increased pressure is generated in the high-pressure region in the flow path downstream of the compressor by the compressor and is preferably maintained up to a pressure-maintaining valve and/or a turbine (see further description of the application). In the sense according to the invention, an air mass flow can contain proportions of water, in particular water vapor, or other substances. Complete closure of the pressure-maintaining valve is naturally not provided during the operation of the compressor. Such an operating characteristic of the compressor allows a particularly efficient and rapid response of a fuel cell system to a demand for an increase in load, that is to say a demand for increased energy output by the fuel cell system.

According to a preferred embodiment of the method according to the invention, it is envisaged that the fuel cell system further comprises a moistening device, in particular an external moistening device, for moistening a membrane of the fuel cell system, in particular wherein the external moistening device is arranged upstream and/or downstream of the at least one cathode portion, in fluid communication with the cathode portion. In the case of step changes to higher fuel cell outputs, more heat is produced, and this must be dissipated from the system. In order to be able to dissipate this heat, it is usually necessary to increase the operating temperature. However, the increased temperature in the steady state promotes drying out of the membrane of the fuel cell system, which has a negative effect on both the performance and the service life of the fuel cell system. In order to recover fluid, in particular water, the moistening device can again be flowed through downstream of the cathode portion. A moistening device, in particular an external moistening device, for moistening a membrane permits an advantageous extension of the service life and/or an increase in the performance of the fuel cell system by simple and inexpensive means.

According to a preferred embodiment of the method according to the invention, provision is made for the pressure in the high-pressure region to be increased by at least partial closure of the pressure-maintaining valve as a function of a moisture content of the membrane. An increase in the energy output leads to higher operating temperatures of the fuel cell system. The pressure conditions within the high-pressure region interact directly with the temperature in the high-pressure region. An increase in the temperature, in particular in the case of the partial closure of the pressure-maintaining valve at a constant or approximately constant mass flow, makes it possible to increase the pressure in the high-pressure region of the fuel cell system. To ensure that the at least one membrane of the fuel cell system always has sufficient moisture, it is an advantageous embodiment of the method according to the invention if the at least partial closure of the pressure-maintaining valve and thus the temperature increase take place as a function of the moisture of the at least one membrane of the fuel cell system. Drying out of the membrane and/or a reduction in the moisture content of the membrane below a critical value can thus advantageously be avoided.

According to a preferred embodiment of the method according to the invention, provision is made for the pressure in the high-pressure region to be reduced by at least partial opening of the pressure-maintaining valve as far as, or almost as far as, a choke limit of a characteristic map of the compressor. In order to achieve the most efficient operating characteristic of the compressor and/or to reach a new operating point of the compressor as quickly as possible for an increased energy output of the fuel cell system, a reduction of the pressure in the high-pressure region of the fuel cell system by at least partial opening of the pressure-maintaining valve as far as, or almost as far as, a choke limit of a characteristic map of the compressor is particularly advantageous. As a result of the operating point profile of the compressor up to the choke limit of the characteristic map, the highest possible mass flow is achieved with an initially constant rotational speed of the compressor. A subsequent increase in rotational speed and air mass flow along the choke limit of the compressor characteristic map represents a particularly effective increase in the mass flow with a small increase in the pressure ratio across the compressor. In the last step of the power increase, the operating point of the compressor moves away from the choke limit of the compressor characteristic map owing to the further increase in rotational speed at a constant or approximately constant air mass flow and an increase in the pressure ratio.

According to a preferred embodiment of the method according to the invention, provision is made for the fuel cell system further to have a turbine, wherein the turbine is arranged downstream of the cathode portion and in fluid communication with the cathode portion, and wherein the pressure-maintaining valve is arranged downstream or upstream of the turbine. The turbine is preferably arranged in an operatively connected manner on one axis with the compressor and a drive device, in particular a motor. The arrangement of the turbine downstream of the cathode portion, in particular at the end of the high-pressure region of the fuel cell system, enables particularly efficient operation of the compressor. The air mass flow can be at least partially expanded across the turbine and can assist the rotation of the compressor by means of the decreasing pressure ratio. A motor serves as a drive device of the preferably common shaft of the compressor and of the turbine.

According to a preferred embodiment of the method according to the invention, provision is made for the fuel cell system further to have a charge air cooler, in particular wherein the charge air cooler is arranged downstream of the compressor and/or upstream of the cathode portion, in fluid communication with the cathode portion. A charge air cooler can advantageously enable cooling of the air mass flow, in particular before entry to the moistening device and/or the cathode portion, and can thus further increase the efficiency of the fuel cell system or reduce the drying out of the membrane in the inlet region of the cathode.

According to a preferred embodiment of the method according to the invention, provision is made for the fuel cell system to have at least one first bypass having at least one first bypass valve, wherein the at least one first bypass has direct fluid-communicating flow guidance from the compressor to the cathode portion, in particular parallel to the external moistening device and/or the charge air cooler. In addition to opening the pressure-maintaining valve, a first bypass makes it possible to reduce the resistance and/or the volume of the fuel cell system through which the air mass flow flows downstream of the compressor. Having at least one first bypass consequently makes it possible, for example, to have a parallel flow path to the charge air cooler and/or to the moistening device, and the air resistance and/or the volume of the charge air cooler and/or of the moistening device is/are thus bypassed. A fuel cell system designed in this way allows more efficient operation or a faster response to a demand for increased energy output by virtue of the reduced time required until the new operating point of the compressor is reached.

According to a preferred embodiment of the method according to the invention, provision is made for the fuel cell system to have at least one second bypass having at least one second bypass valve, wherein the at least one second bypass has direct fluid-communicating flow guidance from the cathode portion to the pressure-maintaining valve and/or the turbine, in particular parallel to the external moistening device. In addition to opening the pressure-maintaining valve, a second bypass makes it possible to reduce the resistance of the fuel cell system for the air mass flow downstream of the cathode portion. Having at least one first bypass consequently makes it possible, for example, to have a parallel flow path to the moistening device, and the air resistance of the charge air cooler is thus bypassed. A fuel cell system designed in this way allows more efficient operation or a faster response to a demand for increased energy output by virtue of the reduced time required until the new operating point of the compressor is reached.

According to a preferred embodiment of the method according to the invention, provision is made for the fuel cell system further to have an air filter, in particular wherein the air filter is arranged upstream of the compressor, in fluid communication with the compressor. An air filter according to the invention makes it possible to filter the air mass flow, in particular upstream of the compressor, and thus allows an increased air quality of the air mass flow within the fuel cell system. Thus, an air mass flow which is, for example, free or almost free of unwanted particles, fluids and/or substances is made possible.

According to a second aspect, the present invention discloses a control device comprising a computing unit and a memory unit, wherein a program is stored in the memory unit which, when at least partially executed in the computing unit, carries out a method as per the first aspect. The control device according to the second aspect of the invention therefore has the same advantages as have already been described for the method according to the invention in accordance with the first aspect of the invention. A method according to the invention can be carried out particularly advantageously if this method is carried out by means of a control device. A control device can further comprise an input and/or output device for interaction with an operator.

According to a third aspect, the present invention discloses a fuel cell system, having a compressor for conveying air, a fuel cell stack with a multiplicity of fuel cells each having at least one cathode portion and at least one anode portion, a turbine, a pressure-maintaining valve, and a control device, wherein the at least one cathode portion is arranged downstream of and in fluid communication with the compressor and upstream of and in fluid communication with the pressure-maintaining valve, wherein the fuel cell system has a high-pressure region upstream of the pressure-maintaining valve and downstream of the compressor, wherein the fuel cell system is designed for carrying out the method according to the first aspect. The control device is preferably designed in accordance with the second aspect. The fuel cell system according to the third aspect of the invention therefore has the same advantages as have already been described for the method according to the invention in accordance with the first aspect of the invention. Furthermore, the turbine can preferably be arranged downstream of the cathode portion and in fluid communication with the cathode portion, and the pressure-maintaining valve can preferably be arranged downstream or upstream of the turbine.

According to an advantageous embodiment of the fuel cell system according to the invention, provision is furthermore made for the fuel cell system to have a charge air cooler, a first bypass having a first bypass valve, a second bypass having a second bypass valve and/or an air filter, in particular wherein the at least one first bypass has direct fluid-communicating flow guidance from the compressor to the cathode portion, in particular parallel to the external moistening device and/or the charge air cooler, and/or wherein the at least one second bypass has direct fluid-communicating flow guidance from the cathode portion to the pressure-maintaining valve and/or the turbine, in particular parallel to the external moistening device. Furthermore, the air filter can be arranged upstream of the compressor, in fluid communication with the compressor. Furthermore, the turbine can be arranged downstream of the cathode portion and in fluid communication with the cathode portion, wherein the pressure-maintaining valve is arranged downstream or upstream of the turbine. Furthermore, the charge air cooler can be arranged downstream of the compressor and/or upstream of the cathode portion, in fluid communication with the cathode portion. The supplementary devices and/or bypasses of the fuel cell system have the same advantages as have already been described in detail for the method according to the invention.

BRIEF DESCRIPTION OF THE DRAWINGS

The following figures are each schematic and

In the following figures, identical reference signs are used for the same technical features, even of different exemplary embodiments.

DETAILED DESCRIPTION

Figure 1:
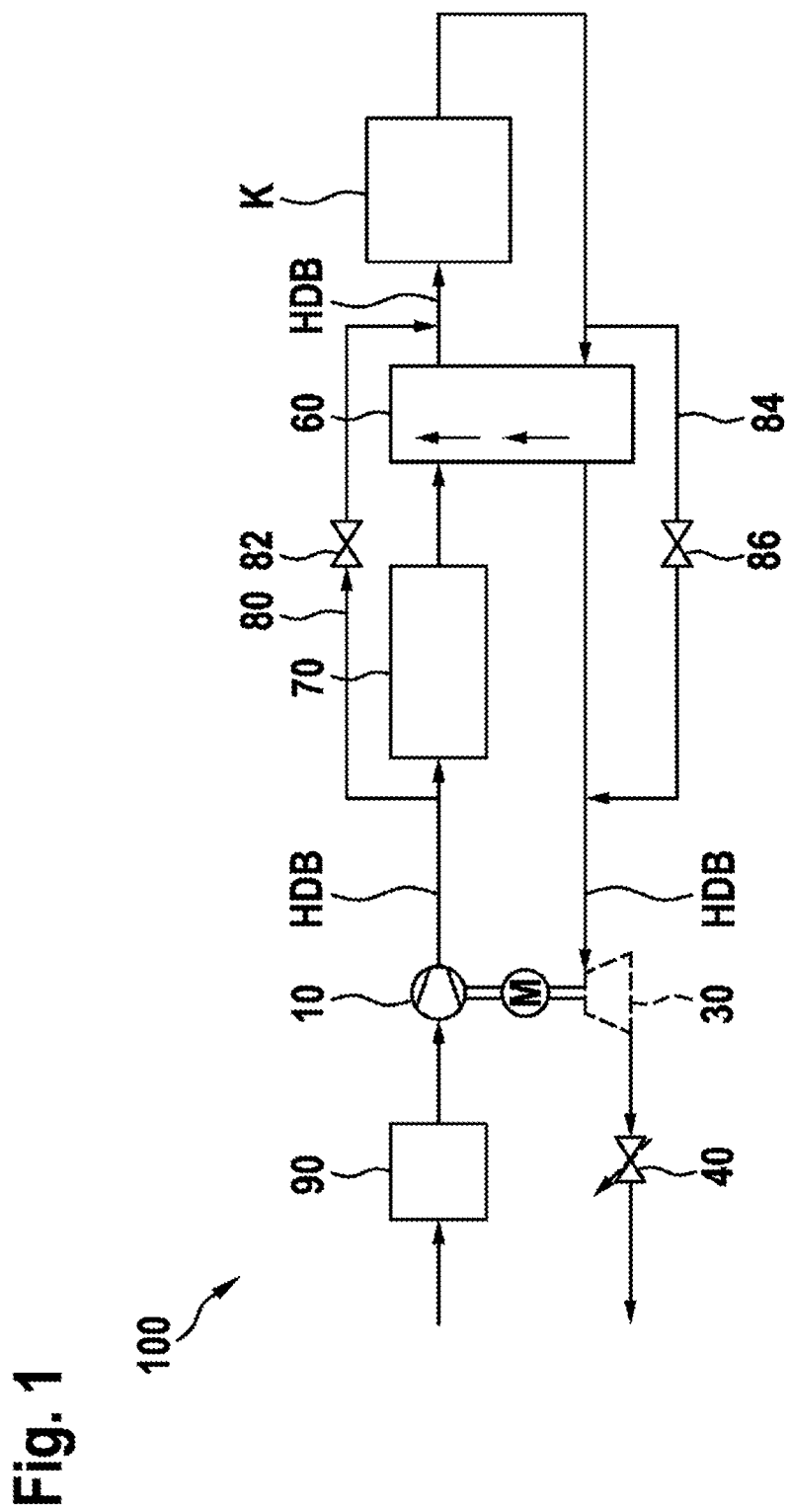
FIG. 1 shows a flow path of the fuel cell system having an air filter, a turbine, a motor and a compressor, a charge air cooler, a moistening device, a cathode portion, a pressure-maintaining valve and a first and a second bypass, each having a first and a second bypass valve, respectively.

FIG. 1 shows a schematic, planar flow path of the fuel cell system 100. FIG. 1 shows the flow path of the air mass flow ms within the fuel cell system 100. By way of example, the fuel cell system 100 has an air filter 90 upstream of the compressor 10. The compressor 10 is operatively coupled, e.g. by means of a shaft, to a motor and a turbine 30. The fuel cell system 100 further has a charge air cooler 70 downstream of the compressor 10 for cooling the air mass flow ms. The fuel cell system 100 further has a moistening device 60, in particular an external moistening device 60, upstream of the at least one cathode portion K. A first bypass 80 having a first bypass valve 82 provides a parallel flow path to the charge air cooler 70 and the moistening device 60 to permit a direct flow path from the compressor 10 to the cathode portion K. In order to recover fluid, in particular water, the moistening device 60 can be flowed through again downstream of the cathode portion K. A second bypass 84 permits a parallel flow path downstream of the cathode portion K. A high-pressure region HDB according to the invention extends downstream from the compressor 10 as far as a pressure-maintaining valve 40 or a turbine 30 of the fuel cell system 100. With the method according to the invention and the control device 50 according to the invention, a fuel cell system 100 according to the invention which is designed in this way particularly advantageously allows a rapid and efficient response of a fuel cell system 100 to a demand for an increase in load, that is to say a demand for increased energy output by the fuel cell system 100.

Figure 2:
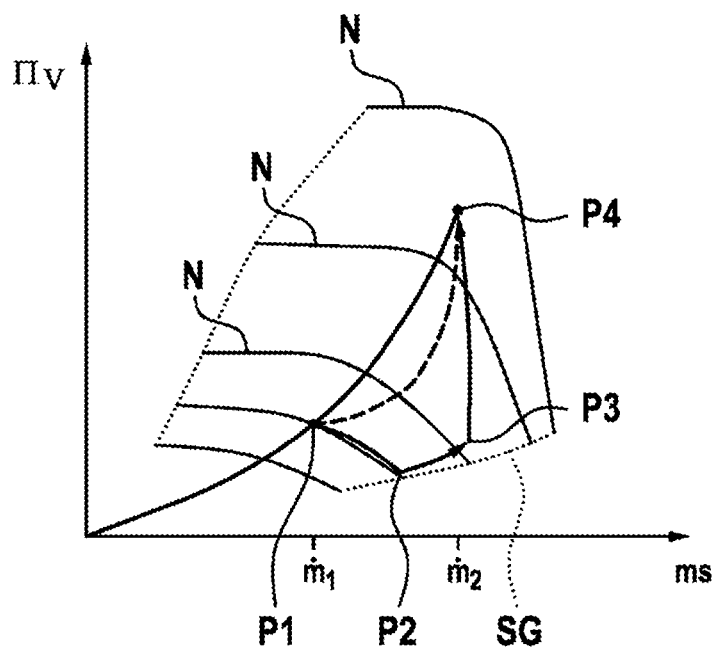
FIG. 2 shows a characteristic map of a compressor, in which the pressure ratio across the compressor is plotted against the air mass flow of the compressor, with an initial state and a target state of the method according to the invention, wherein the characteristic map is bounded by a choke limit and a surge limit and has curves of the same rotational speed.

FIG. 2 shows a characteristic map of a compressor 10, in which the pressure ratio across the compressor 10 is plotted against the air mass flow ms of the compressor 10. An initial state P1 and a target state P4 are shown in the characteristic map. The target state P4 represents the demand for increased power output by the fuel cell system 100. For the increased power output of the fuel cell system 100, an increased mass flow ms is required at the inlet of the cathode portion K (not shown). For a particularly efficient increase in the power of the fuel cell system 100, the air mass flow ms is increased from the initial state P1 along a line N with a constant rotational speed of the compressor 10 to a first intermediate state P2. The air mass flow ms is increased by at least partial opening of the pressure-maintaining valve 40 (not shown) at the end of the high-pressure region HDB (not shown). From the first intermediate state P2 to the second intermediate state P3, the air mass flow ms is further increased by increasing the rotational speed of the compressor 10. From the second intermediate state P3 to the target state P4, with a constant air mass flow ms, the pressure ratio across the compressor 10 is increased by further acceleration of the rotational speed of the compressor 10. Such an operating characteristic of the compressor 10 allows a particularly efficient and rapid response of a fuel cell system 100 to a demand for an increase in load, that is to say a demand for increased energy output by the fuel cell system 100.

Figure 3:
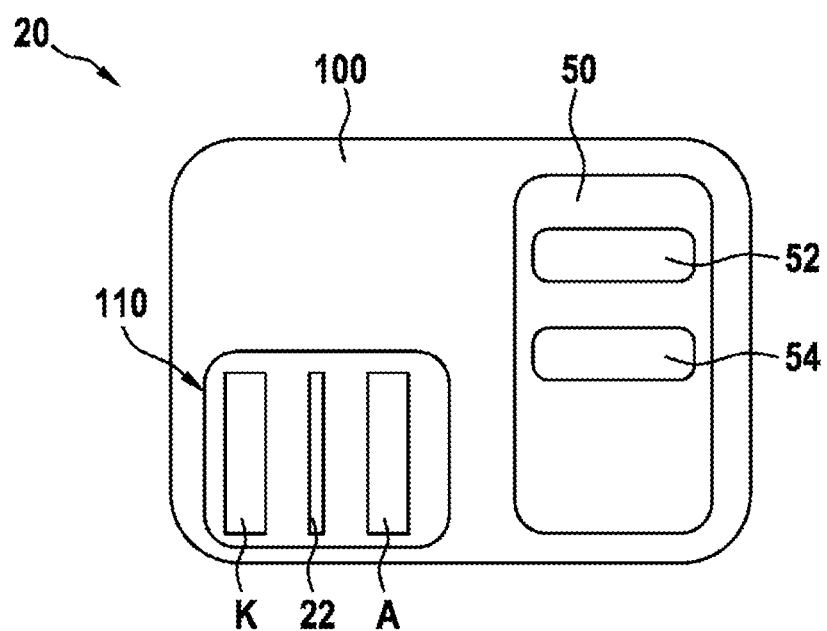
FIG. 3 shows a fuel cell system with a fuel cell of a fuel cell stack and a control device.

A fuel cell system 100 with a fuel cell 110 of a fuel cell stack 20 and a control device 50 is shown in FIG. 3. The control device 50 comprises a computing unit 52 and a memory unit 54, wherein a program is stored in the memory unit 54 which, when at least partially executed in the computing unit 52, carries out a method as per the first aspect.

The invention claimed is:

1. A method for operating a fuel cell system (100), having a fuel cell stack (20) with a multiplicity of fuel cells (110) each having at least one cathode portion (K) and at least one anode portion (A), a compressor (10) for conveying air into the cathode portions (K), a pressure-maintaining valve (40), and a control device (50), wherein the at least one cathode portion (K) is arranged downstream of and in fluid communication with the compressor (10) and upstream of and in fluid communication with the pressure-maintaining valve (40), and an external moistening device (60) for moistening a membrane (22), wherein the external moistening device (60) is arranged upstream and/or downstream of the at least one cathode portion (K), and in fluid communication with the cathode portion (K), wherein the fuel cell system (100) has a high-pressure region (HDB) between the compressor (10) and the pressure-maintaining valve (40), wherein the method comprises the following steps:
   a) receipt of a demand for an increased air mass flow (ms) to the at least one cathode portion (K) by the control device (50),
   b) reduction of the pressure in the high-pressure region (HDB) by at least partial opening of the pressure-maintaining valve (40) by the control device (50),
   c) raising of the air mass flow (ms) to the at least one cathode portion (K) by means of an increase in the speed of the compressor (10) by the control device (50), and
   d) increase in the pressure in the high-pressure region (HDB) by at least partial closure of the pressure-maintaining valve (40) at a constant or approximately constant air mass flow (ms) by the control device (50).

2. The method as claimed in claim 1, wherein
   the pressure in the high-pressure region (HDB) is increased by at least partial closure of the pressure-maintaining valve (40) as a function of a moisture content of the membrane (22).

3. The method as claimed in claim 1, wherein
   the pressure in the high-pressure region (HDB) is reduced by at least partial opening of the pressure-maintaining valve (40) as far as a choke limit (SG) of a characteristic map of the compressor (10),
   wherein
   the characteristic map is bounded by a choke limit (SG) and a surge limit and has curves of a constant rotational speed (N) of the compressor.

4. The method as claimed in claim 1, wherein
   the fuel cell system (100) further comprises a turbine (30), wherein the turbine (30) is arranged downstream of the cathode portion and in fluid communication with the cathode portion (K), and wherein the pressure-maintaining valve (40) is arranged downstream or upstream of the turbine (30).

5. The method as claimed in claim 1, wherein
   the fuel cell system (100) further comprises a charge air cooler (70), wherein the charge air cooler (70) is arranged downstream of the compressor (10) and/or upstream of the cathode portion (K), in fluid communication with the cathode portion (K).

6. The method as claimed in claim 1, wherein
   the fuel cell system (100) has at least one first bypass (80) having at least one first bypass valve (82), wherein the at least one first bypass (80) has direct fluid-communicating flow guidance from the compressor (10) to the cathode portion (K), parallel to the external moistening device (60) and/or the charge air cooler.

7. The method as claimed in claim 1, wherein
   in that the fuel cell system (100) has at least one second bypass (84) having at least one second bypass valve (86), wherein the at least one second bypass (84) has direct fluid-communicating flow guidance from the cathode portion (K) to the pressure-maintaining valve (40) and/or the turbine (30), parallel to the external moistening device (60).

8. The method as claimed in claim 1, wherein
   in that the fuel cell system (100) further comprises an air filter (90), wherein the air filter (90) is arranged upstream of the compressor (10), in fluid communication with the compressor (10).

9. A control device (50), comprising a computer (52) and a memory (54), wherein
   a program is stored in the memory unit (54) which, when at least partially executed in the computing unit (52), carries out a method as claimed in claim 1.

10. A fuel cell system (100) comprising:
    a compressor (10) for conveying air, a fuel cell stack (20) with a multiplicity of fuel cells (110) each having at least one cathode portion (K) and at least one anode portion (A), a turbine (30), a pressure-maintaining valve (40), a control device (50), wherein the at least one cathode portion (K) is arranged downstream of and in fluid communication with the compressor (10) and upstream of and in fluid communication with the pressure-maintaining valve (40), and an external moistening device (60) for moistening a membrane (22), wherein the external moistening device (60) is arranged upstream and/or downstream of the at least one cathode portion (K), and in fluid communication with the cathode portion (K), wherein the fuel cell system (100) has a high-pressure region (HDB) upstream of the pressure-maintaining valve (40) and downstream of the turbine (30), wherein the fuel cell system (100) is configured to a) receive a demand for an increased air mass flow (ms) to the at least one cathode portion (K) by the control device (50), b) reduce the pressure in the high-pressure region (HDB) by at least partial opening of the pressure-maintaining valve (40) by the control device (50), c) raise the air mass flow (ms) to the at least one cathode portion (K) by means of an increase in the speed of the compressor (10) by the control device (50), and d) increase the pressure in the high-pressure region (HDB) by at least partial closure of the pressure-maintaining valve (40) at a constant or approximately constant air mass flow (ms) by the control device (50).

11. The fuel cell system (100) as claimed in claim 10, further comprising:

a charge air cooler (70), a first bypass (80) having a first bypass valve (82), a second bypass (84) having a second bypass valve (86) and/or an air filter (90), wherein the at least one first bypass (80) has direct fluid-communicating flow guidance from the compressor (10) to the cathode portion (K), parallel to the external moistening device (60) and/or the charge air cooler, and/or wherein the at least one second bypass (84) has direct fluid-communicating flow guidance from the cathode portion (K) to the pressure-maintaining valve (40) and/or the turbine (30), parallel to the external moistening device (60).

\* \* \* \* \*